US011383770B2

(12) United States Patent
Ebisumoto et al.

(10) Patent No.: US 11,383,770 B2
(45) Date of Patent: Jul. 12, 2022

(54) VEHICLE-BODY STRUCTURE OF VEHICLE

(71) Applicant: MAZDA MOTOR CORPORATION, Hiroshima (JP)

(72) Inventors: Keisuke Ebisumoto, Aki-gun (JP); Hirotaka Natsume, Aki-gun (JP); Kazuhiro Kageyama, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 177 days.

(21) Appl. No.: 17/008,511

(22) Filed: Aug. 31, 2020

(65) Prior Publication Data
US 2021/0070375 A1    Mar. 11, 2021

(30) Foreign Application Priority Data
Sep. 11, 2019   (JP) .............................. JP2019-165100

(51) Int. Cl.
| *B62D 25/20* | (2006.01) |
| *B60N 2/015* | (2006.01) |
| *B62D 21/02* | (2006.01) |
| *B62D 25/02* | (2006.01) |

(52) U.S. Cl.
CPC ......... *B62D 25/2036* (2013.01); *B60N 2/015* (2013.01); *B62D 21/02* (2013.01); *B62D 25/025* (2013.01)

(58) Field of Classification Search
CPC .. B62D 25/2036; B62D 21/02; B62D 25/025; B62D 21/157; B62D 25/20; B60N 2/015
USPC .................. 296/204, 209, 187.12, 193.07, 30
See application file for complete search history.

(56) References Cited

U.S. PATENT DOCUMENTS

| 10,723,391 | B2 * | 7/2020 | Saeki | ................. | B62D 25/2036 |
| 10,946,903 | B2 * | 3/2021 | Viaux | .................... | B62D 21/03 |
| 11,046,369 | B2 * | 6/2021 | Natsume | ............ | B62D 25/2036 |
| 11,192,586 | B2 * | 12/2021 | Kubota | .................... | B60K 1/04 |
| 11,292,525 | B2 * | 4/2022 | Ebisumoto | ......... | B62D 25/2036 |
| 2005/0194818 | A1 * | 9/2005 | Odaka | .................. | B62D 21/157 296/187.12 |
| 2007/0126264 | A1 * | 6/2007 | Mizuma | ............. | B62D 25/2036 296/204 |
| 2016/0159402 | A1 * | 6/2016 | Nakaya | .................. | B60N 2/005 296/193.02 |

(Continued)

FOREIGN PATENT DOCUMENTS

| JP | 2015-134520 A | 7/2015 |
| JP | 2019-014354 A | 1/2019 |

*Primary Examiner* — D Glenn Dayoan
*Assistant Examiner* — E Turner Hicks
(74) *Attorney, Agent, or Firm* — Studebaker & Brackett PC

(57) ABSTRACT

A vehicle-body structure which prevent deformation of a floor tunnel caused by a side collision load transmitted from a cross member to the floor tunnel via a seat mounting bracket. A pair of left and right backbone frames extending in a vehicle front-rear direction are provided each of which faces a top and a side of a floor tunnel and is fixed to the floor tunnel. A tunnel reinforcement is provided that includes a front projection, an intermediate projection, and a rear projection abutting on an underside of the floor tunnel. The backbone frame includes multiple beads abutting on the floor tunnel. The tunnel reinforcement is fixed at the front projection, the intermediate projection, and the rear projection to the seat mounting bracket via the floor tunnel and is also fixed to the multiple beads of the backbone frame via the floor tunnel.

13 Claims, 10 Drawing Sheets

(56) References Cited

U.S. PATENT DOCUMENTS

| | | | |
|---|---|---|---|
| 2019/0009832 A1* | 1/2019 | Kageyama | B60N 2/015 |
| 2019/0329827 A1* | 10/2019 | Soma | B62D 25/16 |
| 2019/0382053 A1* | 12/2019 | Natsume | B60N 2/015 |
| 2020/0031399 A1* | 1/2020 | Matsuda | B62D 25/2036 |
| 2020/0282816 A1* | 9/2020 | Matsuda | B60K 1/04 |
| 2020/0361535 A1* | 11/2020 | Matsuda | B62D 27/023 |
| 2020/0361542 A1* | 11/2020 | Matsuda | B62D 25/2036 |

\* cited by examiner

VEHICLE-BODY STRUCTURE OF VEHICLE

BACKGROUND

Technical Field

The present disclosure relates to a vehicle-body structure of a vehicle that can withstand a collision from a side of the vehicle.

Background Art

In general, if a B pillar (center pillar) of a vehicle such as an automobile intrudes into a passenger compartment of the vehicle under a side collision load that acts on a side sill at a side of the vehicle due to another vehicle colliding with the side of the vehicle or the side of the vehicle colliding with an obstacle, an occupant will be injured. Thus, a cross member extending in a vehicle width direction of the vehicle has been used to receive the side collision load acting on the side sill and prevent the B pillar from intruding into the passenger compartment.

In vehicles such as front-engine rear-drive (FR) vehicles and four-wheel drive (4WD) vehicles, a floor tunnel extending in a front-rear direction and having a huge cross-section is provided to dispose a propeller shaft that transmits power from a drive source located frontward to drive wheels located rearward. It is important to prevent the side collision load acting via the cross member from concentrating on the floor tunnel with such a huge cross-section.

For example, Japanese Patent Laid-Open No. 2015-134520 discloses a structure in which a cross member abuts on an upper member extending in the front-rear direction between a side sill and a floor tunnel and also abuts on a connecting member provided at a side wall portion of the floor tunnel.

Japanese Patent Laid-Open No. 2019-014354 discloses a lower vehicle-body structure in which, in order to increase both of the rigidity of a side collision load transmission path and the rigidity of a seat mounting portion, a seat mounting bracket mounted to a cross member is joined via a floor tunnel to a tunnel reinforcement provided at an underside of the floor tunnel.

However, the vehicle-body structure disclosed in Japanese Patent Laid-Open No. 2019-014354 has the following problem. When the vehicle includes a floor tunnel with a huge cross-section like the aforementioned FR vehicle, the tunnel reinforcement itself becomes large, and thus the side collision load, which is transmitted from the cross member to the tunnel reinforcement via the seat mounting bracket and the floor tunnel, cannot be received by the tunnel reinforcement alone. This renders the floor tunnel prone to deformation.

SUMMARY

The present disclosure has been made in view of the above conventional problem and aims to provide a vehicle-body structure of a vehicle that can prevent deformation of the floor tunnel caused by the side collision load transmitted from the cross member to the floor tunnel via the seat mounting bracket.

Accordingly, the present disclosure is a vehicle-body structure of a vehicle, the vehicle-body structure including a pair of left and right side sills extending in a front-rear direction of a vehicle; floor panels extending from vehicle-width-direction inner side ends of the side sills toward a vehicle-width-direction inner side; a floor tunnel connecting vehicle-width-direction inner side ends of the floor panels and having a shape protruding upward; a pair of left and right cross members connecting the side sills and the floor tunnel; a seat mounting bracket mounted to both ends in a vehicle width direction of the cross member; a pair of left and right backbone frames facing a top and a side of the floor tunnel and fixed to the floor tunnel, the pair of left and right backbone frames extending in a vehicle front-rear direction; and a tunnel reinforcement having a front projection, an intermediate projection, and a rear projection abutting on an underside of the floor tunnel. The backbone frame includes a plurality of beads abutting on the floor tunnel, and the tunnel reinforcement is fixed at the front projection, the intermediate projection, and the rear projection to the seat mounting bracket via the floor tunnel and is also fixed to the plurality of beads of the backbone frame via the floor tunnel.

Ridges of the front projection, the intermediate projection, and the rear projection of the tunnel reinforcement and ridges of the beads of the backbone frame are in contact with each other.

The vehicle-body structure includes a first front abutting portion, a first intermediate abutting portion, and a first rear abutting portion abutting on the plurality of beads of the backbone frame respectively at the front projection, the intermediate projection, and the rear projection, and includes a second front abutting portion, a second intermediate abutting portion, and a second rear abutting portion abutting on the seat mounting bracket.

The vehicle-body structure includes a front recess and a rear recess protruding in a direction away from the underside of the floor tunnel respectively between the front projection and the intermediate projection and between the intermediate projection and the rear projection.

The tunnel reinforcement includes an extended portion rearward of the rear abutting portion, and the extended portion includes, at a rear end thereof, a rear end projection fixed to an additional bead of the backbone frame.

The vehicle-body structure further includes a rear end recess protruding in a direction away from the underside of the floor tunnel between the rear projection and the rear end projection.

According to the disclosure, the tunnel reinforcement is fixed at the front projection, the intermediate projection, and the rear projection to the seat mounting bracket via the floor tunnel and is also fixed to the multiple beads of the backbone frame via the floor tunnel. This allows the side collision load input from the cross beam to the seat mounting bracket in the event of a side collision to be transmitted to the multiple beads of the backbone frame via the front projection, the intermediate projection, and the rear projection of the tunnel reinforcement, and this restrains deformation of the tunnel reinforcement as well as the floor tunnel.

According to the disclosure, ridges of the front projection, the intermediate projection, and the rear projection of the tunnel reinforcement are in contact with ridges of the beads of the backbone frame. This allows the side collision load to be surely transmitted to the multiple beads of the backbone frame via the front projection, the intermediate projection, and the rear projection of the tunnel reinforcement.

According to the disclosure, the vehicle-body structure includes a first front abutting portion, a first intermediate abutting portion, and a first rear abutting portion abutting on the multiple beads of the backbone frame respectively at the front projection, the intermediate projection, and the rear projection, and includes a second front abutting portion, a second intermediate abutting portion, and a second rear abutting portion abutting on the seat mounting bracket. This allows for easy and reliable joining of the tunnel reinforcement and the backbone frame and of the tunnel reinforcement and the seat mounting bracket via these abutting portions.

According to the disclosure, the vehicle-body structure includes a front recess and a rear recess protruding in a direction away from the underside of the floor tunnel respectively between the front projection and the intermediate projection and between the intermediate projection and the rear projection. This increases the rigidity of the tunnel reinforcement with these continuous projections and recesses.

According to the disclosure, the tunnel reinforcement includes an extended portion rearward of the rear abutting portion, and the extended portion includes, at a rear end thereof, a rear end projection fixed to an additional bead of the backbone frame. This increases the rigidity of the floor tunnel and surely restrains deformation of the floor tunnel even when the side collision load is input from the seat mounting bracket to a front portion of the tunnel reinforcement.

According to the disclosure, the vehicle-body structure includes a rear end recess protruding in a direction away from the underside of the floor tunnel between the rear projection and the rear end projection. This increases the rigidity of the tunnel reinforcement with these continuous projections and recess.

DETAILED DESCRIPTION

Figure 1:
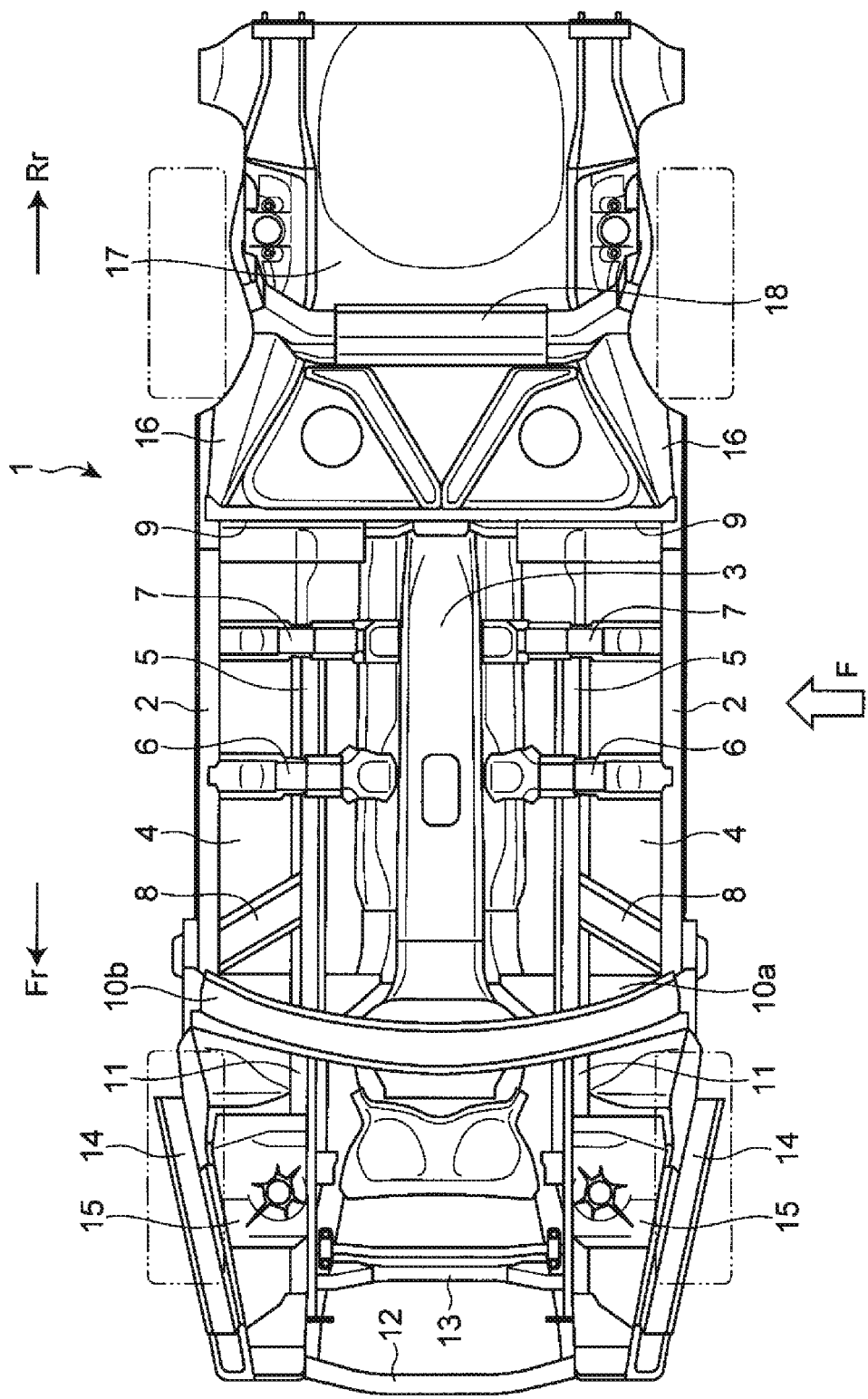
FIG. 1 is a plan view of a lower vehicle-body of an automobile having a vehicle-body structure according to an embodiment of the present disclosure.

An embodiment of the present disclosure will be described below with reference to the accompanying drawings. Throughout the drawings, reference characters Fr and Rr respectively refer to a front side (or frontward) and a rear side (or rearward) of an automobile, and reference characters OUT and IN respectively refer to an outside (or outward) and an inside (or inward) of the automobile in the vehicle width direction.

<Overall Structure of Lower Vehicle-Body>

FIG. 1 shows a lower vehicle-body 1 of the automobile having a vehicle-body structure of a vehicle according to an embodiment of the present disclosure. The lower vehicle-body 1 includes a pair of left and right side sills 2 extending in a vehicle front-rear direction, a floor tunnel 3 disposed at a center in the vehicle width direction between the pair of left and right side sills 2 and extending in the vehicle front-rear direction, and floor panels 4 extending from vehicle-width-direction inner side ends of the pair of left and right side sills 2 toward a vehicle-width-direction inner side up to the floor tunnel 3.

A pair of left and right floor frames 5 each extending in the vehicle front-rear direction between a corresponding one of the pair of left and right side sills 2 and the floor tunnel 3 are disposed in the lower vehicle-body 1 each as a reinforcement member. A first cross member 6 and a second cross member 7 laid between each one of the pair of left and right side sills 2 and the floor tunnel 3 are disposed in this order toward the vehicle rear side.

An oblique frame 8 extending obliquely rearward from each one of the pair of left and right side sills 2 to a corresponding one of the pair of left and right floor frames 5 is disposed frontward of the first cross member 6. A third cross member 9 laid in the vehicle width direction between each one of the pair of left and right side sills 2 and the floor tunnel 3 is disposed rearward of the second cross member 7.

Meanwhile, the lower vehicle-body 1 includes, in its front portion, a dash panel 10a, a dash panel cowl 10b, a pair of left and right front side frames 11, a bumper reinforcement 12, a front cross member 13, apron members 14, a suspension housing 15, and the like. The lower vehicle-body 1 includes, in its rear portion, a pair of left and right rear side frames 16 extending from respective rear ends of the pair of left and right side sills 2 to the vehicle rear side, a rear floor panel 17 extending in the vehicle width direction between the pair of left and right rear side frames 16, and a rear cross member 18. Detailed description of the oblique frame 8, the third cross member 9, and the front and rear components of the lower vehicle-body 1 has been omitted as they do not relate directly to the present disclosure.

<Side Sill>

Figure 3:
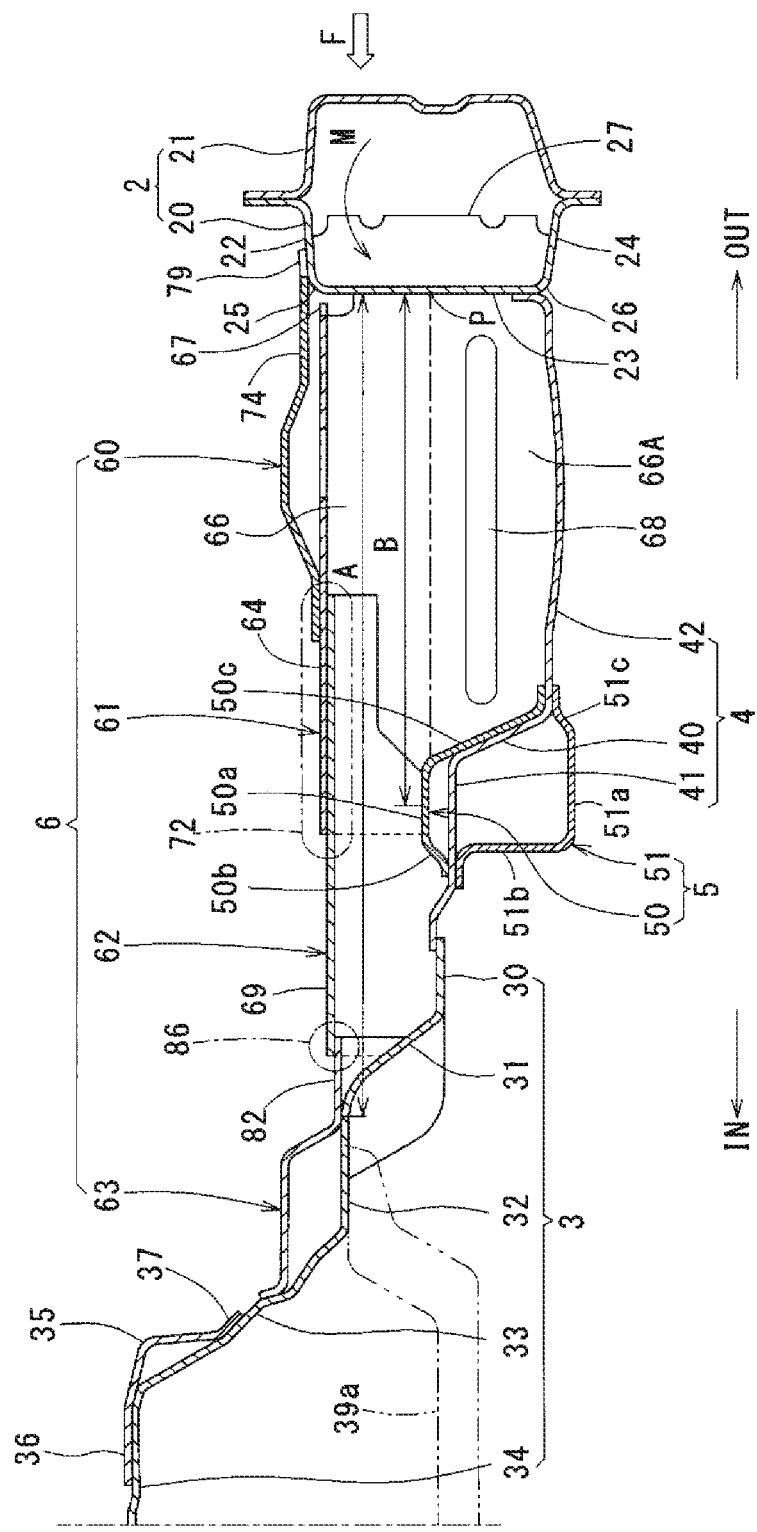
FIG. 3 is a sectional view of the first cross member in a vehicle width direction.

As shown in FIG. 3, each of the pair of left and right side sills 2 is composed of a side sill inner panel 20 with a cross-section of a hat-shaped profile opening toward the vehicle-width-direction outer side and a side sill outer panel 21 with a cross-section of a hat-shaped profile opening toward the vehicle-width-direction inner side.

The side sill inner panel 20 includes a top face 22, a side face 23 extending downward from a vehicle-width-direction inner side end of the top face 22, a bottom face 24 extending from a lower end of the side face 23 toward the vehicle-width-direction outer side, an upper ridge portion 25 between the top face 22 and the side face 23, and a lower ridge portion 26 between the bottom face 24 and the side face 23. A reinforcement plate 27 is fixed inside the side sill inner panel 20 at multiple positions in the vehicle front-rear direction, particularly positions overlapping the first cross member 6 and the second cross member 7 in the vehicle front-rear direction.

The side sill outer panel 21 has a shape similar to that of the side sill inner panel 20 and facing the side sill inner panel 20. The side sill inner panel 20 and the side sill outer panel 21 are joined so as to form a substantially rectangular closed cross-section in the vehicle width direction. Lower portions of a hinge pillar supporting a front door and a center pillar supporting a rear door are joined to the side sill 2, though not shown in the figures.

<Floor Tunnel>

Figure 2:
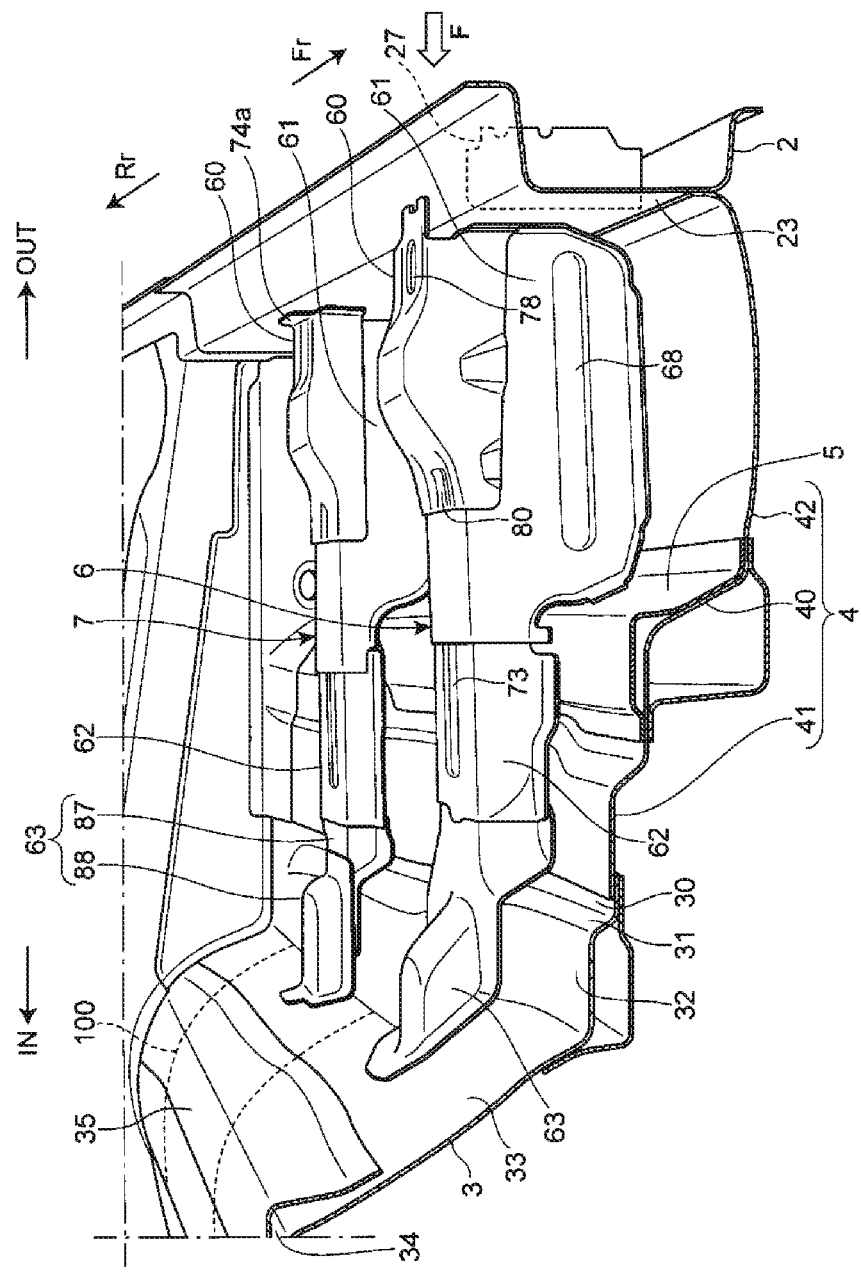
FIG. 2 is a perspective view of a first cross member and a second cross member of the lower vehicle-body as viewed from a vehicle front side toward a vehicle rear side.

As shown in FIG. 1, the floor tunnel 3 extends in the vehicle front-rear direction from the dash panel 10a to the third cross member 9. As shown in FIG. 2, the floor tunnel 3 has a hat-shaped profile opening downward and protruding upward in its cross-section in the vehicle width direction. Specifically, as shown in FIG. 3, the floor tunnel 3 is composed of a flange portion 30 joined to the floor panel 4, a wall rising portion 31 rising upward from the flange portion 30, a raised portion 32 extending from the wall rising portion 31 toward the vehicle-width-direction inner side and positioned one step higher than the flange portion 30, an inclined wall portion 33 obliquely rising from the raised portion 32 toward the center in the vehicle width direction, and a top plate portion 34.

Figure 9:
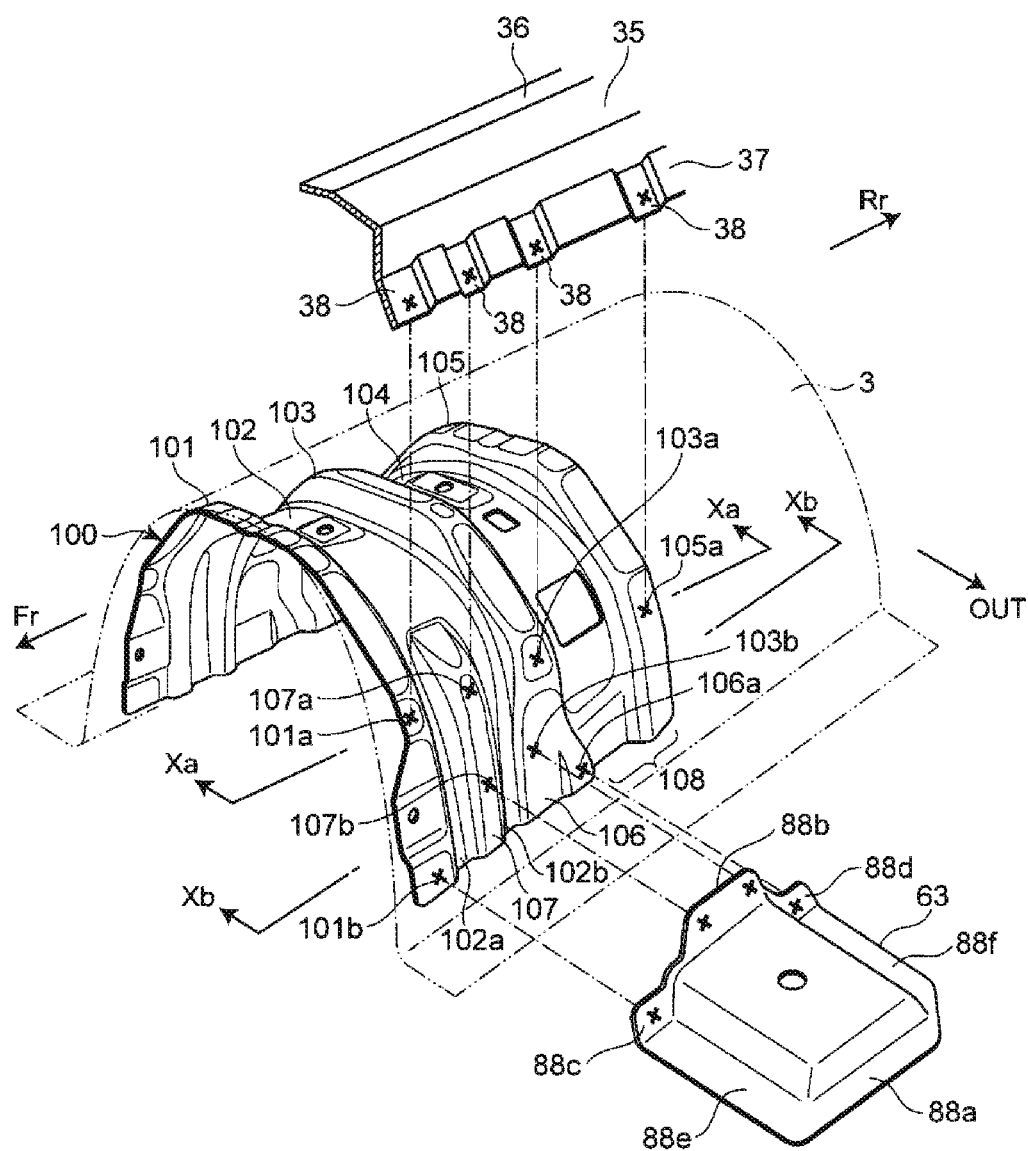
FIG. 9 is an enlarged exploded perspective view showing how the tunnel-side seat mounting bracket of the second cross member is connected to the floor tunnel, a tunnel reinforcement, and a backbone frame.

A pair of left and right backbone frames 35 is mounted on a top side of the floor tunnel 3. Each of the pair of left and right backbone frames 35 has an inverted L-shaped cross-section in the vehicle width direction so as to form a closed cross-section with the top plate portion 34 and the inclined wall portion 33 of the floor tunnel 3 which the backbone frame 35 faces. An upper flange portion 36 and a lower flange portion 37 are provided at respective ends in the vehicle width direction of the backbone frame 35. The upper flange portion 36 and the lower flange portion 37 are respectively joined to the top plate portion 34 and the inclined wall portion 33 of the floor tunnel 3. In particular, as shown in FIG. 9, the lower flange portion 37 of the backbone frame 35 is formed with multiple beads 38 (linearly extending recesses or projections formed by pressing a material) extending in the vehicle width direction at its portions joined to the floor tunnel 3 at positions thereof overlapping the second cross member 7 in the vehicle front-rear direction. The multiple beads 38 are joined to a tunnel reinforcement 100 (described later) through the floor tunnel 3.

A mount member 39a for supporting a rear portion of a transmission (not shown) is mounted to an underside of the raised portion 32 on both sides of the floor tunnel 3 in the vehicle width direction, and this restrains the decrease in vehicle-body rigidity that would otherwise occur due to the first cross members 6 on both sides being separated by the floor tunnel 3.

<Floor Panel>

Returning to FIG. 3, the floor panel 4 extends from a vehicle-width-direction inner side end of the side sill 2 toward the vehicle-width-direction inner side. In other words, a vehicle-width-direction outer side end of the floor panel 4 is joined to the side face 23 of the side sill inner panel 20, and a vehicle-width-direction inner side end of the floor panel 4 is joined to the flange portion 30 on both sides of the floor tunnel 3 in the vehicle width direction. Also, the floor panel 4 extends in the vehicle front-rear direction from the dash panel 10a to the third cross member 9 in FIG. 1.

The floor panel 4 includes a step portion 40 provided at an approximate center between the side sill 2 and the floor tunnel 3 and extending in the vehicle front-rear direction, a first floor panel 41 on the vehicle-width-direction inner side of the step portion 40, and a second floor panel 42 on the vehicle-width-direction outer side of the step portion 40. The step portion 40 is provided with a floor frame 5 described later. The second floor panel 42 is formed at a position lower than the first floor panel 41. In other words, the second floor panel 42 located between a floor upper frame of the floor frame 43 and the side sill is formed at a position lower than the first floor panel located between the floor upper frame and the floor tunnel 3. This allows a rectifier (not shown) to be only provided below the first floor panel 41 and eliminates the need for providing the rectifier below the second floor panel 42, helping reduce the area of the rectifier.

Each of the pair of left and right floor frames 5 is provided such that the step portion 40 of the floor panel 4 is interposed in the floor frame 5 in an up-down direction, and extends in the vehicle front-rear direction. The floor frame 5 is composed of a floor upper frame 50 forming a closed cross-section jointly with a top side of the step portion 40 of the floor panel 4, and a floor lower frame 51 forming a closed cross-section jointly with an underside of the step portion 40 of the floor panel 4.

The floor upper frame 50 includes a frame top face 50a facing the first floor panel 41, a frame side face 50b extending from a vehicle-width-direction inner side end of the frame top face 50a to the first floor panel 41, and a frame side face 50c extending from a vehicle-width-direction outer side end of the frame top face 50a to the second floor panel 42. The frame top face 50a of the floor upper frame 50 is provided at a position higher than a center position P between the upper ridge portion 25 and the lower ridge portion 26 of the side sill 2 in the up-down direction. A lower end of the frame side face 50b on the vehicle-width-direction inner side is joined to a top side of the first floor panel 41, and a lower end of the frame side face 50c on the vehicle-width-direction outer side is joined to a top side of the second floor panel 42.

The floor lower frame 51 includes a frame bottom face 51a facing the first floor panel 41, a frame side face 51b extending from a vehicle-width-direction inner side end of the frame bottom face 51a to the first floor panel 41, and a frame side face 51c extending from a vehicle-width-direction outer side end of the frame bottom face 51a to the second floor panel 42. The frame bottom face 51a of the floor lower frame 51 is provided at substantially the same position as the second floor panel 42. An upper end of the frame side face 51b on the vehicle-width-direction inner side is joined to an underside of the first floor panel 41, and an upper end of the frame side face 51c on the vehicle-width-direction outer side is joined to an underside of the second floor panel 42.

<First Cross Member>

The first cross member 6 is composed of a first member 61 on a side sill-side and a second member 62 on a floor tunnel-side. The first member 61 is mounted with a sill-side seat mounting bracket 60, and the second member 62 is mounted with a tunnel-side seat mounting bracket 63.

Figure 4:
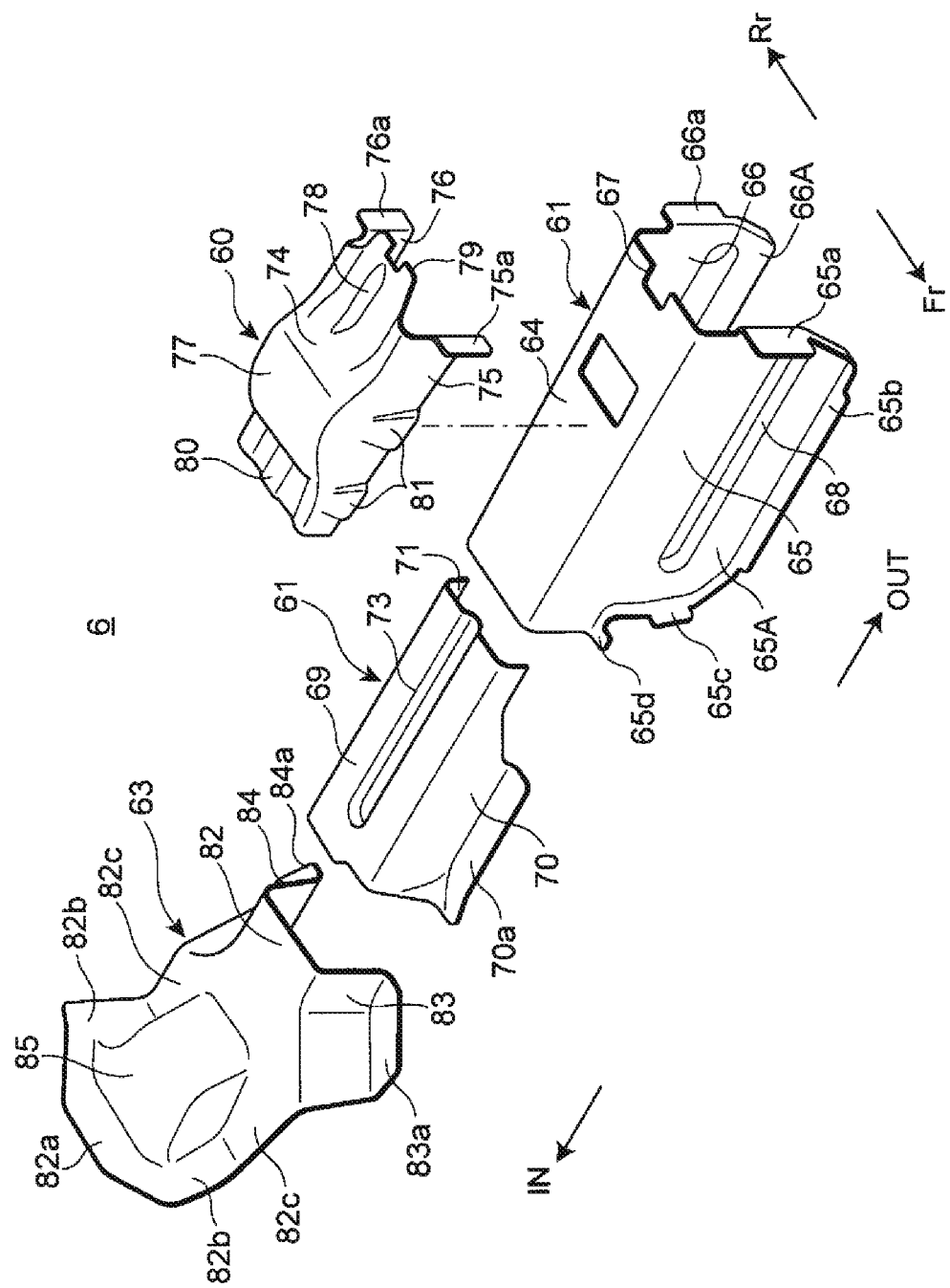
FIG. 4 is an enlarged exploded perspective view showing components of the first cross member.

The first member 61 extends from the side sill 2 to the frame top face 50a of the floor upper frame 50. As shown in FIG. 4, the first member 61 has a hat-shaped cross-section in the vehicle front-rear direction and includes a top face 64 facing the floor panel 4 and a front face 65 and a rear face 66 extending from respective ends in the vehicle front-rear direction of the top face 64 to the floor panel 4. The front face 65 and the rear face 66 respectively includes a front lower portion 65A and a rear lower portion 66A at positions lower than the first floor panel 41.

Flanges 65a, 66a are provided to respective vehicle-width-direction outer side ends of the front face 65 and the rear face 66 of the first member 61, and the flanges 65a, 66a are joined to the side face 23 of the side sill 2. Flanges 65b, 66b are provided to respective lower ends of the front face 65 and the rear face 66 of the first member 61, and the flanges 65b, 66b are joined to the second floor panel 42. Flanges 65c, 66c, 65d, 66d are provided to vehicle-width-direction inner side ends of the front face 65 and the rear face 66 of the first member 61, and the flanges 65c, 66c are joined to the frame side face 50c of the floor upper frame 50 and the flanges 65d, 66d are joined to the frame top face 50a of the floor upper frame 50.

Figure 5A:
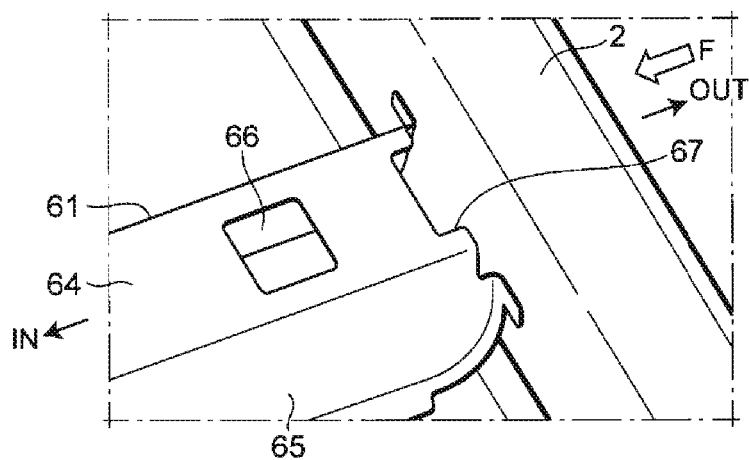
FIG. 5A is a perspective view showing an example of a fragile portion at a portion where a first member of the first cross member is mounted to a side sill.
Figure 5B:
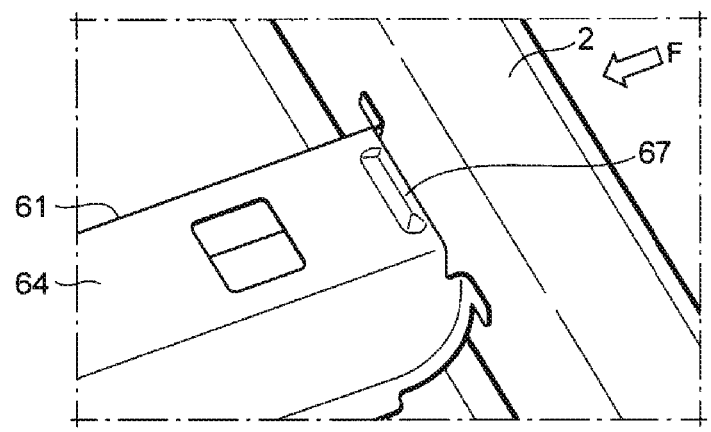
FIG. 5B is a perspective view showing a modification of the fragile portion.
Figure 5C:
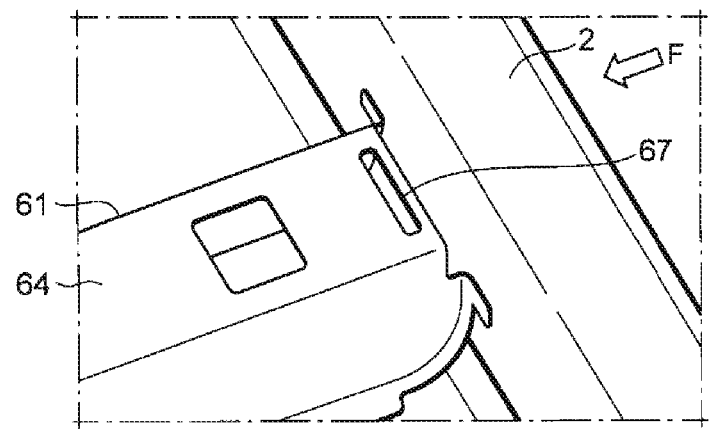
FIG. 5C is a perspective view showing another modification of the fragile portion.

The top face 64 of the first member 61 includes, at its vehicle-width-direction outer side end, a fragile portion 67 formed of a cutout. The fragile portion 67 functions to transmit a side collision load to the top face 64 of the first cross member 6 in the event of a side collision by cutting a part of the vehicle-width-direction outer side end of the top face 64 of the first member 61 as shown in FIG. 5A and thereby allowing the vehicle-width-direction outer side end of the top face 64 to be preferentially crushed under the side collision load. Besides the cutout, the fragile portion 67 may be a bead or a hole extending in the vehicle front-rear direction as shown in FIGS. 5B and 5C; in short, the fragile portion 67 is only required to weaken the rigidity in the vehicle width direction of the vehicle-width-direction outer side end of the top face.

A recessed bead 68 extending in the vehicle width direction is formed in each of the front face 65 and the rear face 66 of the first member 61. Preferably, the beads 68 are provided above the second floor panel 42 and below the aforementioned center position P between the upper ridge portion 25 and the lower ridge portion 26 in the up-down direction of the side sill 2. The beads 68 increase the rigidity of the front face 65 and the rear face 66 of the first member 61 against the side collision load.

The second member 62 extends from a vehicle-width-direction inner side end of the first member 61 to the floor tunnel 3. As shown in FIG. 3, the second member 62 has a hat-shaped cross-section in the vehicle front-rear direction and includes a top face 69 facing the floor panel 4 and a front face 70 and a rear face 71 extending from respective ends in the vehicle front-rear direction of the top face 69 to the floor panel 4.

A vehicle-width-direction outer side end of the top face 69 of the second member 62 is positioned below a vehicle-width-direction inner side end of the top face 64 of the first member 61 and, as shown in FIG. 3, is overlapped with and joined to the vehicle-width-direction inner side end of the top face 64 of the first member 61 to form a high-strength portion 72 that has a larger plate thickness than the front lower portion 65A and the rear lower portion 66A of the first member 61 and the front face 70 and the rear face 71 of the second member 62 and is given a high strength. Flanges 70a, 71a are provided to respective lower ends of the front face 70 and the rear face 71 of the second member 62, and the flanges 70a, 71a are joined to the second floor panel 42. The vehicle-width-direction outer side end of the top face 69 of the second member 62 extends to a joined portion of the first member 61 and the sill-side seat mounting bracket 60, and this gives the high-strength portion 72 a higher strength than a high-strength portion 86 (described later) between the second member 62 and the tunnel-side seat mounting bracket 63.

A recessed bead 73 extending in the vehicle width direction is formed in the top face 69 of the second member 62. The bead 73 is provided so as to overlap beads 78, 80 (described later) of the sill-side seat mounting bracket 60 in the vehicle front-rear direction.

The sill-side seat mounting bracket 60 is a fixing member for fixing a seat rail of the vehicle and is also a reinforcement member for reinforcing a sill-side end of the top face 64 of the first member 61 of the first cross member 6. The sill-side seat mounting bracket 60 includes a top face 74 facing the top face 64 of the first member 61 and a front face 75 and a rear face 76 extending from respective ends in the vehicle front-rear direction of the top face 74 to the floor panel 4.

A seat rail mounting portion 77 protruding upward is formed at a center in the vehicle width direction of the top face 74 of the sill-side seat mounting bracket 60. A recessed bead 78 extending in the vehicle width direction is formed at an end of the top face 74 on the outside of the seat rail mounting portion 77 of the sill-side seat mounting bracket 60. A protruding piece 79 protruding to the vehicle-width-direction outer side is formed at a vehicle-width-direction outer side end of the top face 74 of the sill-side seat mounting bracket 60, and the protruding piece 79 abuts on and is joined to the top face 22 of the side sill 2. An upward projecting bead 80 extending in the vehicle width direction is formed at an inner end of the top face 74 of the sill-side seat mounting bracket 60, and on both sides of the bead 80, the sill-side seat mounting bracket 60 abuts on and is joined to the top face 64 of the first member 61.

Multiple projecting beads 81 extending in the up-down direction are formed in each of the front face 75 and the rear face 76 of the sill-side seat mounting bracket 60, and on both sides of each bead 81, the front face 75 and the rear face 76 abut on and are joined to the front face 65 and the rear face 66, respectively, of the first member 61. Flanges 75a, 76a are formed on respective vehicle-width-direction outer side ends of the front face 75 and the rear face 76 of the sill-side seat mounting bracket 60, and the flanges 75a, 76a abut on and are joined to the side face 23 of the side sill 2.

The tunnel-side seat mounting bracket 63 is a fixing member for fixing the seat rail of the vehicle. The tunnel-side seat mounting bracket 63 extends from a vehicle-width-direction inner side end of the floor panel 4 to the inclined wall portion 33 of the floor tunnel 3. A vehicle-width-direction outer side half of the tunnel-side seat mounting bracket 63 has a hat-shaped cross-section in the vehicle front-rear direction formed by a top face 82, a front face 83, and a rear face 84. A seat rail mounting portion 85 protruding upward is formed on a top side of a vehicle-width-direction inner side half of the tunnel-side seat mounting bracket 63.

A vehicle-width-direction outer side end of the tunnel-side seat mounting bracket 63 is positioned below a vehicle-width-direction inner side end of the top face 69 of the second member 62 and is overlapped with and joined to the vehicle-width-direction inner side end of the top face 69 of the second member 62 to form, as shown in FIG. 3, a high-strength portion 86 that has a larger plate thickness than the front lower portion 65A and the rear lower portion 66A of the first member 61 and the front face 70 and the rear face 71 of the second member 62 and is given a high strength.

A flange 82a is provided to a vehicle-width-direction inner side end of the tunnel-side seat mounting bracket 63, and the flange 82a abuts on and is joined to the inclined wall portion 33 of the floor tunnel 3.

Flanges 82b, 82c are provided to each end in the vehicle front-rear direction of the vehicle-width-direction inner side half of the tunnel-side seat mounting bracket 63, and the flanges 82b, 82c abut on and are joined to the inclined wall portion 33 and the raised portion 32, respectively, of the floor tunnel 3. Flanges 83a, 84a are provided to the front face 83 and the rear face 84, respectively, of the vehicle-width-direction outer side half of the tunnel-side seat mounting bracket 63, and the flanges 83a, 84a are joined to a vehicle-width-direction inner side end of the first floor panel 41.

Figure 6A:
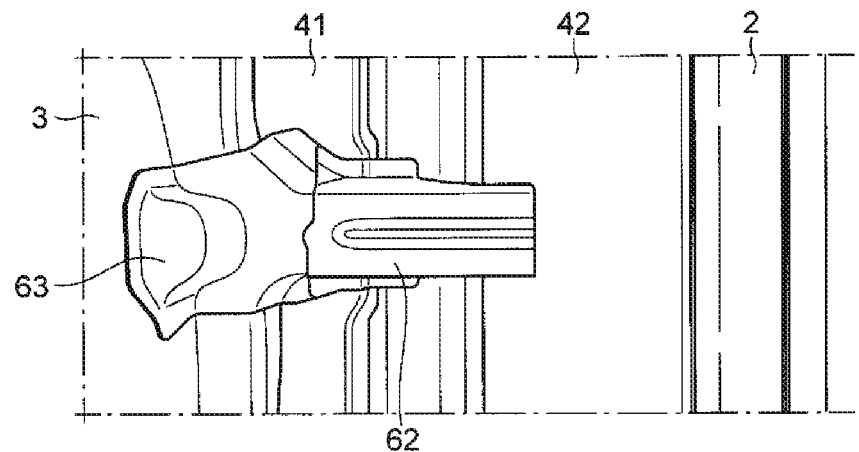
FIGS. 6A-6C are plan views showing a procedure for mounting the first cross member.
Figure 6B:
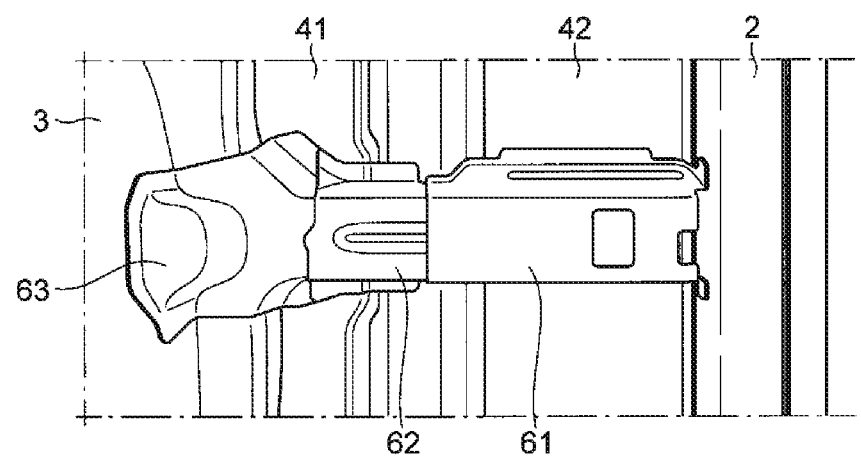
Figure 6C:
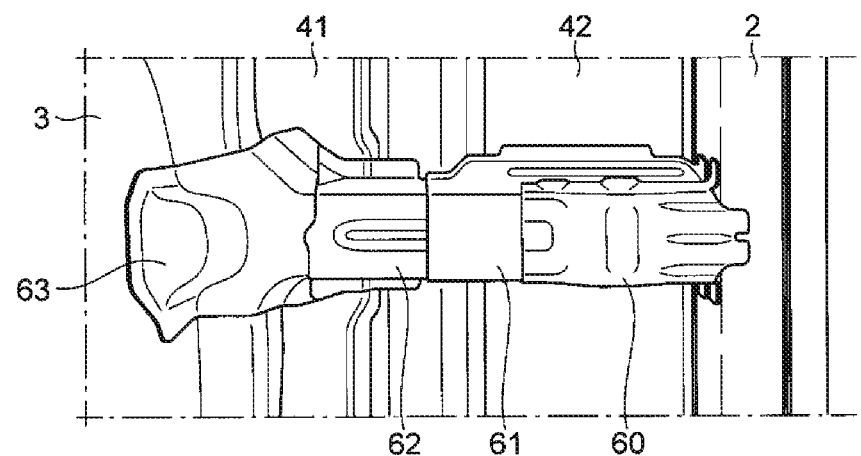

In assembling the first cross member 6, as shown in FIGS. 6A-6C, the tunnel-side seat mounting bracket 63 is first mounted to the floor tunnel 3, and then the second member 62 is mounted so as to overlap a vehicle-width-direction outer side end of the tunnel-side seat mounting bracket 63 (FIG. 6A). Then, a vehicle-width-direction inner side end of the first member 61 is overlapped with and mounted to a vehicle-width-direction outer side end of the second member 62, and a vehicle-width-direction outer side end of the first member 61 is mounted to the side sill 2 (FIG. 6B). Finally, the sill-side seat mounting bracket 60 is overlapped with and mounted to the first member 61, and a vehicle-width-direction outer side end of the sill-side seat mounting bracket 60 is mounted to the side sill 2. (FIG. 6C). Two adjacent members or all members may be sub-assembled in advance.

<Second Cross Member>

Figure 7:
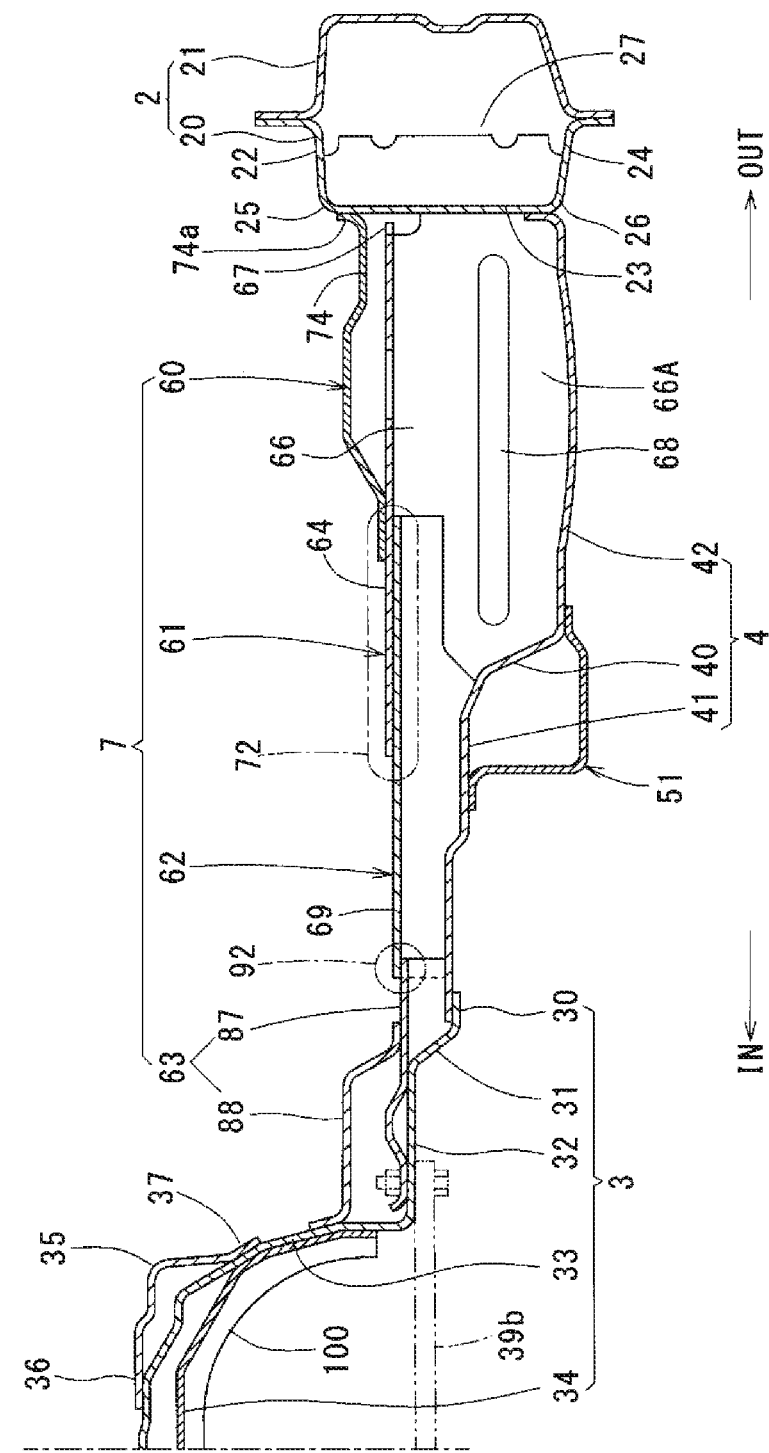
FIG. 7 is a sectional view of the second cross member in the vehicle width direction.

Similarly to the first cross member 6, the second cross member 7 is composed of the first member 61 on the side sill-side and the second member 62 on the floor tunnel-side as shown in FIG. 7, and the first member 61 is mounted with the sill-side seat mounting bracket 60 and the second member 62 is mounted with the tunnel-side seat mounting bracket 63.

The second cross member 7 has a similar structure to that of the first cross member except that the second cross member 7 is positioned generally lower than the first cross member 6, the tunnel-side seat mounting bracket 63 is composed of a lower bracket 87 and an upper bracket 88, and a tunnel reinforcement 100 is provided inside the floor tunnel 3 to which the tunnel-side seat mounting bracket 63 is mounted. Accordingly, description of equivalent parts has been omitted and only differences will be described below.

Because the second cross member 7 is positioned generally lower than the first cross member 6, a flange 74a protruding upward is provided to a vehicle-width-direction outer side end of a top face of the sill-side seat mounting bracket 60, and the flange 74a abuts on and is joined to the side face 23 of the side sill 2.

The tunnel-side seat mounting bracket 63 of the second cross member 7 is composed of the lower bracket 87 and the upper bracket 88.

Figure 8:
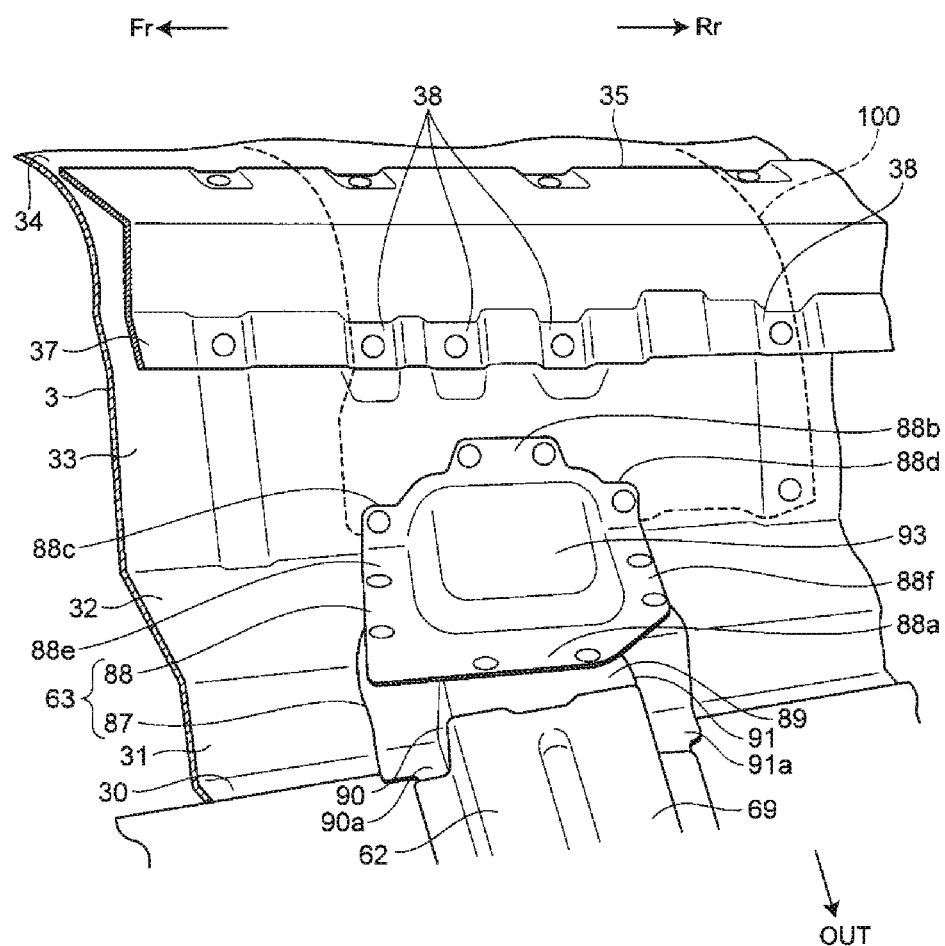
FIG. 8 is an enlarged perspective view of a joining portion of a tunnel-side seat mounting bracket of the second cross member and a floor tunnel.

The lower bracket 87 extends from the raised portion 32 of the floor tunnel 3 to the vehicle-width-direction inner side end of the floor panel 4. As shown in FIG. 8, a vehicle-width-direction outer side half of the lower bracket 87 has a hat-shaped cross-section in the vehicle front-rear direction formed by a top face 89, a front face 90, and a rear face 91.

Via the raised portion 32 of the floor tunnel 3, the lower bracket 87 is bolted to both ends of a tunnel member 39b that connects both ends in the vehicle width direction of the floor tunnel 3, and this restrains the decrease in vehicle-body rigidity that would otherwise occur due to the second cross members 7 on both sides being separated by the floor tunnel 3.

A vehicle-width-direction outer side end of the lower bracket 87 is positioned below a vehicle-width-direction inner side end of the top face 69 of the second member 62 and is overlapped with and joined to the vehicle-width-direction inner side end of the top face 69 of the second member 62 to form a high-strength portion 92 that has a larger plate thickness than the front lower portion 65A and the rear lower portion 66A of the first member 61 and the front face 70 and the rear face 71 of the second member 62 and is given a high strength.

Flanges 90a, 91a are formed at respective ends in the vehicle front-rear direction of the front face 90 and the rear face 91 in the vehicle-width-direction outer side half of the lower bracket 87, and the flanges 90a, 91a abut on and are joined to the vehicle-width-direction inner side end of the floor panel 4. An inner end and front-rear direction ends in the vehicle-width-direction inner side half of the lower bracket 87 abut on and are joined to the raised portion 32 of the floor tunnel 3.

The upper bracket 88 is disposed above the lower bracket 87. The upper bracket 88 is formed on its top side with a seat rail mounting portion 93 protruding upward. A flange 88a is provided to a vehicle-width-direction outer side end of the upper bracket 88, and the flange 88a abuts on and is joined to the top face 89 of the lower bracket 87.

Flanges 88b, 88c, 88d are provided to a vehicle-width-direction inner side end of the upper bracket 88, and these flanges 88b, 88c, 88d abut on the inclined wall portion 33 of the floor tunnel 3 and are joined to the tunnel reinforcement 100 (described later) via the inclined wall portion 33. Also, flanges 88e, 88f are provided to respective ends in the vehicle front-rear direction of the upper bracket 88, and these flanges 88e, 88f abut on and are joined to the raised portion 32 of the floor tunnel 3.

<Tunnel Reinforcement>

A tunnel reinforcement 100 is mounted to an underside of the floor tunnel 3 to which the tunnel-side seat mounting bracket 63 of the second cross member 7 is joined. The tunnel reinforcement 100 is substantially saddle-shaped with its cross-section in the vehicle width direction being in the form of an inverted U-shape opening downward.

Figure 10A:
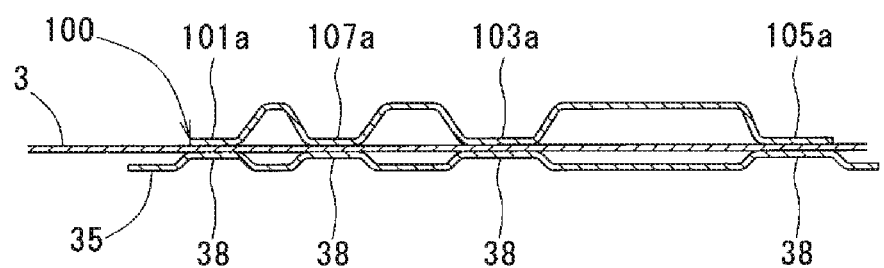
FIG. 10A is a sectional view along the line Xa-Xa in FIG. 9.
Figure 10B:
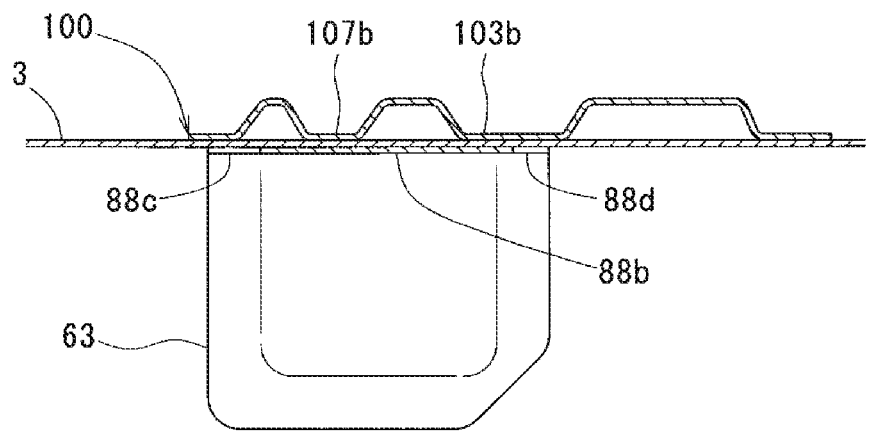
FIG. 10B is a sectional view along the line Xb-Xb in FIG. 9.

As shown in FIGS. 10A and 10B, the tunnel reinforcement 100 includes a front projection 101, a front recess 102, a rear projection 103, a rear recess 104, and a rear end projection 105 disposed in this order in the vehicle front-rear direction, and these are provided so as to extend in a circumferential direction. The rear projection 103 is formed, at its each end in the vehicle width direction, a wide portion 106 that is wider than an intermediate portion of the rear projection 103. The front recess 102 includes, on its each side in the vehicle width direction, an intermediate projection 107 that is provided so as to extend in the up-down direction along the front projection 101 and the rear projection 103. A first front recess 102a and a second front recess 102b are provided to respective ends in the vehicle front-rear direction of the intermediate projection 107. When viewed from inside the tunnel reinforcement 100, the front projection 101, the first front recess 102a, the intermediate projection 107, the second front recess 102b, and the rear projection 103 form a substantially W-shaped cross-section in the vehicle front-rear direction. Also, the rear projection 103, the rear recess 104, and the rear end projection 105 form a substantially U-shaped cross-section in the vehicle front-rear direction.

The tunnel reinforcement 100 is joined to the underside of the floor tunnel 3 and, as explained below, also joined to the backbone frame 35 and the tunnel-side seat mounting bracket 63 via the floor tunnel 3.

That is, as shown in FIG. 10A, the front projection 101, the intermediate projection 107, the rear projection 103, and the rear end projection 105 are respectively provided with a first front abutting portion 101a, a first intermediate abutting portion 107a, a first rear abutting portion 103a, and a first rear end abutting portion 105a that abut on and are welded to the respective beads 38 of the backbone frame 35 via the floor tunnel 3.

Also, as shown in FIG. 10B, the intermediate projection 107 and the rear projection 103 are respectively provided with a second intermediate abutting portion 107b and a second rear abutting portion 103b that abut on and are welded to the flange 88b of the tunnel-side seat mounting bracket 63 via the floor tunnel 3. Also, the front projection 101 and the wide portion 106 of the rear projection 103 are respectively provided with a second front abutting portion 101b and a third rear abutting portion 106a that respectively abut on and are welded to the flanges 88c, 88d of the tunnel-side seat mounting bracket 63 via the floor tunnel 3.

The tunnel reinforcement 100 is provided with an extended portion 108 rearward of the tunnel-side seat mounting bracket 63, and accordingly the length of the tunnel reinforcement 100 in the vehicle front-rear direction is longer than that of the tunnel-side seat mounting bracket 63 of the second cross member 7.

<Functions of Cross Members in the Event of Side Collision>

Below a description will be given of functions of the first cross member 6 and the second cross member 7 of the above-configured lower vehicle-body 1 according to the present embodiment in the event of a side collision.

In the lower vehicle-body 1 of the present embodiment, the first cross member 6 and the second cross member 7 extending in the vehicle width direction receive a side collision load F that acts on the side sill 2 as shown in FIG. 1 when another vehicle collides with a side of the vehicle or when the side of the vehicle collides with an obstacle. This prevents a pillar (not shown) from intruding into a passenger compartment.

That is, as shown in FIG. 3, in the first cross member 6 in the lower vehicle-body 1 of the present embodiment, the top face 64 of the first member 61 is joined to the side sill 2 via the sill-side seat mounting bracket 60, the vehicle-width-direction inner side end of the top face 64 of the first member 61 is joined to the vehicle-width-direction outer side end of the top face 69 of the second member 62, and the vehicle-width-direction inner side end of the top face 64 of the second member 62 is joined to a vehicle-width-direction outer side end of the top face 82 of the tunnel-side seat mounting bracket 63, and the tunnel-side seat mounting bracket 63 is joined to the raised portion 32 and the inclined wall portion 33 of the floor tunnel 3. Thus, the top faces 64, 69, 74, and 82 of the first cross member 6 are joined to the side sill 2 and the floor tunnel 3 (the part A in FIG. 3).

Also, in the first cross member 6, the vehicle-width-direction outer side ends of the front face 65 and the rear face 66 of the first member 61 are joined to the side sill 2, and the vehicle-width-direction inner side ends of the front face 65 and the rear face 66 of the first member 61 are joined to the frame top face 50a of the floor upper frame 50 at a position higher than the center position P of the side sill 2 in the up-down direction (the part B in FIG. 3).

Thus, the first cross member 6 can counteract a side collision load in the event of a side collision with its first bracing effect provided by the part A in FIG. 7 of the top faces 64, 69, 74, and 82 of the first cross member between the side sill 2 and the floor tunnel 3 and with its second bracing effect provided by the part B in FIG. 7 of the front face 65 and the rear face 66 of the first member 61 between the side sill 2 and the frame top face 50a of the floor upper frame 50, resisting the inwardly falling motion of the side sill 2 toward the vehicle-width-direction inner side as shown by the arrow M in FIG. 3. The same applies to the second cross member 7. Thus, even though the vehicle has a lowered floor including the second floor panel 42 lower than the first floor panel 41, the first cross member 6 and the second cross member 7 can effectively distribute and transfer the side collision load F in the vehicle width direction from the side sill 2 to the floor upper frame 50 and the floor tunnel 3.

Further, the bead 68 extending in the vehicle width direction is provided in each of the front face 65 and the rear face 66 of the first member 61 of the first cross member between the side sill 2 and the frame side face 50b. This prevents out-of-plane deformation (buckling) of the front face 65 and the rear face 66 and allows the side collision load F to be effectively supported by the bracing between the side sill 2 and the floor upper frame 50 in the event of a side collision, helping avoid stress concentration on the floor tunnel 3 that may occur when the side collision load F is mainly supported by any bracing between the side sill 2 and the floor tunnel 3.

Additionally, the top faces 64, 69, 74, and 82 of the first cross member 6 connect the raised portion 32 of the floor tunnel 3 and the side sill 2, and the front face 65 and the rear face 66 of the first member 61 connect the wall rising portion 31 of the floor tunnel 3 and the side sill 2. This allows the side collision load F to be received between the side sill 2 and each of the wall rising portion 31 and the raised portion 32 of the floor tunnel 3, helping avoid stress concentration on the inclined wall portion 33 and the top plate portion 34, which constitute a main body of the floor tunnel 3.

<Functions of High-Strength Portions of Cross Member>

In the lower vehicle-body 1 of the present embodiment, the high-strength portions 72, 86 having a larger thickness than the front lower portion 65A and the rear lower portion 66A of the first member 61 and given a high strength are provided to the first cross member 6 and the second cross member 7 at the overlapped portion of the sill-side seat mounting bracket 60 and the top face 64 of the first member 61, at the overlapped portion of the top face 64 of the first member 61 and the top face 69 of the second member 62, and at the overlapped portion of the top face 69 of the second member 62 and the tunnel-side seat mounting bracket 63. This allows the side collision load F, which is input to the first cross member 6 and the second cross member 7 so as to cause the side sill 2 to fall inward to the inside of the vehicle cabin in the event of a side collision, to be surely transmitted in the vehicle width direction via the high-strength portions 72, 86. This can restrain deformation of the front face 65 and the rear face 66 of the first member 61 facing the lowered second floor panel 42.

Since the high-strength portions 72, 86 are portions made by overlapping multiple members including the first member 61, the second member 62, the sill-side seat mounting bracket 60 and the tunnel-side seat mounting bracket 63, the high-strength portions can be configured with a simple configuration.

The sill-side seat mounting bracket 60 and the tunnel-side seat mounting bracket 63 are respectively mounted to the first member 61 and the second member 62 having the high-strength portions 72, 86, and this restrains deformation of the sill-side seat mounting bracket 60 and the tunnel-side seat mounting bracket 63 and reduces impact on an occupant sitting in the seat in the event of a side collision.

The sill-side seat mounting bracket 60, the first member 61, the second member 62, and the tunnel-side seat mounting bracket 63 are fixed to each other such that one closer to the side sill 2 lies on top of another adjacent one closer to the floor tunnel 3. Accordingly, when the side collision load F causing inward falling deformation of the side sill 2 is input to the first cross member 6 and the second cross member 7, compressive force in the surface direction acts on the overlapped portion of each member, which can restrain peeling of the overlapped portion.

As shown in FIG. 2, the bead 73 on the top side of the second member 62 is provided so as to overlap the beads 78, 80 of the sill-side seat mounting bracket 60 in the vehicle front-rear direction. This allows the side collision load F on the side sill 2 to be transmitted to the vehicle-width-direction inner side via the beads 78, 80 of the sill-side seat mounting bracket 60 and the bead 73 of the second member 62.

<Functions of Fragile Portion in Cross Beam>

In the lower vehicle-body 1 of the present embodiment, the fragile portion 67 formed of a cutout extending in the vehicle front-rear direction is provided to a side-sill side end of the first member 61 at a position overlapping the sill-side seat mounting bracket 60 in each of the first cross member 6 and the second cross member 7.

In the event of a side collision, due to the side collision load F being applied to the side sill, a moment M acts on the side sill 2 so as to cause it to fall inward. Under this bending moment M, first, a proximal end of the protruding piece 79 of the sill-side seat mounting bracket 60 joined to the top face 22 of the side sill 2 experiences out-of-plane deformation. Because the seat mounting bracket 60 on the vehicle-width-direction inner side of the protruding piece 79 has high rigidity by virtue of its hat-shaped cross-section, the side collision is transmitted to the fragile portion 67 at the vehicle-width-direction outer side end of the top face 64 of the first member 61.

Thus, the fragile portion 67 of the first member 61 crushes and thereby absorbs energy of the side collision, restraining buckling deformation of the first cross member 6 and the second cross member 7 from occurring in their portions where such deformation is not intended to occur. Further, guiding the side collision load F preferentially in the direction in which the fragile portion 67 crushes allows to effectively distribute and transfer the side collision load F in the vehicle width direction.

Also, the sill-side seat mounting bracket 60 as the reinforcement member is provided to the side sill-side end of the top face 64 of the first member 61 of each of the first cross member 6 and the second cross member 7. Thus, the sill-side seat mounting bracket 60 as the reinforcement member can receive a region including the crushed fragile portion 67 and thereby allows the side collision load F after crushing the fragile portion 67 to be transmitted in the vehicle width direction via the sill-side seat mounting bracket 60 as the reinforcement member as well as the first member 61 and the second member 62.

The fragile portion 67 is selected from a cutout, a bead, and a hole. Hence, the fragile portion 67 can be formed by simple processing and also its deformation behavior in the event of a side collision can be controlled.

The reinforcement member is the sill-side seat mounting bracket 60, and the fragile portion 67 is positioned on the vehicle-width-direction outer side of the seat rail mounting portion 77 of the sill-side seat mounting bracket 60. Hence, even when the fragile portion 67 is crushed and deformed in the event of a side collision, it does not reach the seat rail mounting portion 77 of the sill-side seat mounting bracket 60, and thus impact on an occupant sitting on the seat can be reduced.

The fragile portion 67 is provided only on the top face 64 at the side sill-side end of the first member 61. Hence, ridge portions between the top face 64 and the front face 65 and between the top face 64 and the rear face 66 remain uncrushed in the event of a side collision, allowing the side collision load F to be transmitted in the vehicle width direction.

<Functions of Tunnel Reinforcement>

In the lower vehicle-body 1 of the present embodiment, as shown in FIG. 9, the tunnel reinforcement 100 is fixed at its second front abutting portion 101*b*, second intermediate abutting portion 107*b*, second rear abutting portion 103*b*, and third rear abutting portion 106*a* to the tunnel-side seat mounting bracket 63 via the floor tunnel 3. Also, the tunnel reinforcement 100 is fixed at its first front abutting portion 101*a*, first intermediate abutting portion 107*a*, and first rear abutting portion 103*a* to the multiple beads 38 of the backbone frame 35 via the floor tunnel 3. Thus, the side collision load F input from the second cross member 7 to the tunnel-side seat mounting bracket 63 in the event of a side collision is transmitted to the tunnel reinforcement 100 via the second front abutting portion 101*b*, the second intermediate abutting portion 107*b*, the second rear abutting portion 103*b*, and the third rear abutting portion 106*a* of the tunnel reinforcement 100 and further can be transmitted to the multiple beads 38 of the backbone frame 35 via the first front abutting portion 101*a*, the first intermediate abutting portion 107*a*, and the first rear abutting portion 103*a* of the tunnel reinforcement 100. This restrains deformation of the tunnel reinforcement 100 as well as the floor tunnel 3.

Additionally, ridges of the first front abutting portion 101*a*, the first intermediate abutting portion 107*a*, and the first rear abutting portion 103*a* of the tunnel reinforcement 100 and ridges of the beads 38 of the backbone frame 35 are in contact with each other. This allows the side collision load F to be surely transmitted to the multiple beads 38 of the backbone frame 35 via the first front abutting portion 101*a*, the first intermediate abutting portion 107*a*, and the first rear abutting portion 103*a* of the tunnel reinforcement 100.

The tunnel reinforcement 100 includes, respectively in the front projection 101, the intermediate projection 107, and the rear projection 103, the first front abutting portion 101*a*, the first intermediate abutting portion 107*a*, and the first rear abutting portion 103*a* that abut on the respective multiple beads 38 of the backbone frame 35, and includes the second front abutting portion 102*a*, the second intermediate abutting portion 107*b*, the second rear abutting portion 103*b*, and the third rear abutting portion 106*a* that abut on the seat mounting bracket 63. This allows for easy and reliable joining of the tunnel reinforcement 100 and the backbone frame 35 and of the tunnel reinforcement 100 and the seat mounting bracket 63 via these abutting portions.

The tunnel reinforcement 100 includes, respectively between the front projection 101 and the intermediate projection 107 and between the intermediate projection 107 and the rear projection 103, the front recess 102*a* and the rear recess 102*b* protruding in a direction away from the underside of the floor tunnel 3. The tunnel reinforcement 100 further includes the rear end recess 104 protruding in the direction away from the underside of the floor tunnel 3 between the rear projection 103 and the rear end projection 105. These continuous projections and recesses can increase the rigidity of the tunnel reinforcement 100.

The tunnel reinforcement 100 includes the extended portion 108 rearward of the rear abutting portion 103, and the extended portion 108 includes, at its rear end, a rear end projection 105 fixed to the additional bead 38 of the backbone frame 35. This tunnel reinforcement 100 elongated in the vehicle front-rear direction by virtue of its extended portion 108 increases the rigidity of the floor tunnel 3, which as a result allows to surely restrain deformation of the floor tunnel 3 even when the side collision load F is input from the seat mounting bracket 63 to the front portion of the tunnel reinforcement 100.

The present disclosure is not limited to the above embodiment and may be modified in various ways without departing from the scope of the present disclosure.

For example, although the tunnel-side seat mounting bracket 63 of the second cross member 7 is composed of the lower bracket 87 and the upper bracket 88, it may be composed of a single component similarly to the tunnel-side seat mounting bracket 63 of the first cross member 6. Conversely, the tunnel-side seat mounting bracket 63 of the first cross member 6 may be composed of the lower bracket 87 and the upper bracket 88 similarly to the tunnel-side seat mounting bracket 63 of the second cross member 7.

What is claimed is:

1. A vehicle-body structure of a vehicle, the vehicle-body structure comprising:
   a pair of left and right side sills extending in a front-rear direction of a vehicle;
   floor panels extending from vehicle-width-direction inner side ends of the side sills toward a vehicle-width-direction inner side;
   a floor tunnel connecting vehicle-width-direction inner side ends of the floor panels and having a shape protruding upward;
   a pair of left and right cross members connecting the side sills and the floor tunnel;
   a seat mounting bracket mounted to both ends in a vehicle width direction of the cross member;
   a pair of left and right backbone frames facing a top and a side of the floor tunnel and fixed to the floor tunnel, the pair of left and right backbone frames extending in a vehicle front-rear direction; and
   a tunnel reinforcement having a front projection, an intermediate projection, and a rear projection abutting on an underside of the floor tunnel,
   wherein
   each of the backbone frames includes a plurality of beads abutting on the floor tunnel, and
   the tunnel reinforcement is fixed at the front projection, the intermediate projection, and the rear projection to the seat mounting bracket via the floor tunnel and is also fixed to the plurality of beads of the backbone frames via the floor tunnel.

2. The vehicle-body structure of a vehicle according to claim 1, wherein
   ridges of the front projection, the intermediate projection, and the rear projection of the tunnel reinforcement and ridges of the beads of the backbone frames are in contact with each other.

3. The vehicle-body structure of a vehicle according to claim 2, further comprising:
   a first front abutting portion, a first intermediate abutting portion, and a first rear abutting portion abutting on the plurality of beads of the backbone frames respectively at the front projection, the intermediate projection, and the rear projection; and
   a second front abutting portion, a second intermediate abutting portion, and a second rear abutting portion abutting on the seat mounting bracket.

4. The vehicle-body structure of a vehicle according to claim 3, further comprising:
   a front recess and a rear recess protruding in a direction away from the underside of the floor tunnel respectively between the front projection and the intermediate projection and between the intermediate projection and the rear projection.

5. The vehicle-body structure of a vehicle according to claim 4, wherein
   the tunnel reinforcement includes an extended portion rearward of the rear abutting portion, and
   the extended portion includes, at a rear end thereof, a rear end projection fixed to an additional bead of the backbone frames.

6. The vehicle-body structure of a vehicle according to claim 5, further comprising:
   a rear end recess protruding in a direction away from the underside of the floor tunnel between the rear projection and the rear end projection.

7. The vehicle-body structure of a vehicle according to claim 1, further comprising:
   a first front abutting portion, a first intermediate abutting portion, and a first rear abutting portion abutting on the plurality of beads of the backbone frames respectively at the front projection, the intermediate projection, and the rear projection; and
   a second front abutting portion, a second intermediate abutting portion, and a second rear abutting portion abutting on the seat mounting bracket.

8. The vehicle-body structure of a vehicle according to claim 1, further comprising:
   a front recess and a rear recess protruding in a direction away from the underside of the floor tunnel respectively between the front projection and the intermediate projection and between the intermediate projection and the rear projection.

9. The vehicle-body structure of a vehicle according to claim 1, wherein
   the tunnel reinforcement includes an extended portion rearward of the rear abutting portion, and
   the extended portion includes, at a rear end thereof, a rear end projection fixed to an additional bead of the backbone frames.

10. The vehicle-body structure of a vehicle according to claim 7, further comprising:
    a front recess and a rear recess protruding in a direction away from the underside of the floor tunnel respectively between the front projection and the intermediate projection and between the intermediate projection and the rear projection.

11. The vehicle-body structure of a vehicle according to claim 7, wherein
    the tunnel reinforcement includes an extended portion rearward of the rear abutting portion, and
    the extended portion includes, at a rear end thereof, a rear end projection fixed to an additional bead of the backbone frames.

12. The vehicle-body structure of a vehicle according to claim 9, further comprising:
    a rear end recess protruding in a direction away from the underside of the floor tunnel between the rear projection and the rear end projection.

13. The vehicle-body structure of a vehicle according to claim 11, further comprising:
    a rear end recess protruding in a direction away from the underside of the floor tunnel between the rear projection and the rear end projection.

* * * * *